United States Patent
Min et al.

(10) Patent No.: US 8,750,787 B2
(45) Date of Patent: Jun. 10, 2014

(54) METHOD FOR CHANGING A PREAMBLE IN MOVING NETWORK SYSTEM, AND SYSTEM FOR SAME

(75) Inventors: Chan Ho Min, Seoul (KR); Young Hyun Jeon, Guri-si (KR); Jong Hyung Kwun, Seoul (KR); Hyu Dae Kim, Daegu Metropolitan (KR); Min Suk Kang, Daejeon Metropolitan (KR); Dong Won Lee, Daejeon Metropolitan (KR)

(73) Assignees: Samsung Electronics Co., Ltd., Suwon-si (KR); Korea Advanced Institute of Science and Technology, Daejeon Metropolitan (KR)

( * ) Notice: Subject to any disclaimer, the term of this patent is extended or adjusted under 35 U.S.C. 154(b) by 264 days.

(21) Appl. No.: 13/141,216

(22) PCT Filed: Dec. 22, 2009

(86) PCT No.: PCT/KR2009/007683
§ 371 (c)(1),
(2), (4) Date: Jun. 21, 2011

(87) PCT Pub. No.: WO2010/074491
PCT Pub. Date: Jul. 1, 2010

(65) Prior Publication Data
US 2011/0256825 A1 Oct. 20, 2011

(30) Foreign Application Priority Data
Dec. 23, 2008 (KR) .................. 10-2008-0132319

(51) Int. Cl.
*H04B 7/14* (2006.01)

(52) U.S. Cl.
USPC ............. 455/7; 455/11.1; 455/13.1; 455/436; 370/315; 370/331

(58) Field of Classification Search
USPC ........... 455/7, 11.1, 15, 67.11, 436, 438, 450; 370/401, 400, 331, 338, 315, 329
See application file for complete search history.

(56) References Cited

U.S. PATENT DOCUMENTS

2007/0153758 A1* 7/2007 Kang et al. ................. 370/338
2008/0108350 A1* 5/2008 Hamasaki et al. .......... 455/436
(Continued)

FOREIGN PATENT DOCUMENTS

KR    10-2006-0046676 A    5/2006
KR    10-2007-0046499 A    5/2007

*Primary Examiner* — Tan Trinh
(74) *Attorney, Agent, or Firm* — Jefferson IP Law, LLP (57) ABSTRACT

The present invention relates to a method for changing a preamble in a moving network system, and a system for same. The method comprises the steps of: enabling a base station to select a relay, to change a preamble thereof from at least two relays using a first preamble; enabling the selected relay to alternately transmit a signal using the first preamble and a signal using a second preamble to at least one terminal controlled by the selected relay; enabling the selected relay to judge whether the preamble of said at least one terminal is completely changed; and enabling the selected relay to transmit only the signal using the second preamble to said at least one terminal if the preamble is completely changed. The method for changing a preamble in a moving network system and the system for same according to the present invention minimizes communication cutoff time under the condition in which a mobile relay should change a preamble, to thereby effectively provide all terminals with information without a loss, and improve the utilization of a moving network.

16 Claims, 9 Drawing Sheets

(56) References Cited

U.S. PATENT DOCUMENTS

| | | | |
|---|---|---|---|
| 2008/0219275 A1* | 9/2008 | Boariu et al. | 370/401 |
| 2008/0220790 A1* | 9/2008 | Cai et al. | 455/450 |
| 2009/0088164 A1* | 4/2009 | Shen et al. | 455/436 |
| 2009/0303918 A1* | 12/2009 | Ma et al. | 370/315 |
| 2009/0303919 A1* | 12/2009 | Kang et al. | 370/315 |
| 2010/0002582 A1* | 1/2010 | Luft et al. | 370/230.1 |
| 2010/0061339 A1* | 3/2010 | Kim et al. | 370/331 |
| 2010/0248619 A1* | 9/2010 | Senarath et al. | 455/11.1 |
| 2012/0329442 A1* | 12/2012 | Luft et al. | 455/418 |
| 2013/0095750 A1* | 4/2013 | Senarath et al. | 455/11.1 |

* cited by examiner

METHOD FOR CHANGING A PREAMBLE IN MOVING NETWORK SYSTEM, AND SYSTEM FOR SAME

BACKGROUND OF THE INVENTION

1. Field of the Invention

The present invention relates to a preamble change method and system for a moving network system and, in particular, to a preamble change method for minimizing data loss when preamble collision occurs between relay node operating in non-transparent mode and system therefor.

2. Description of the Related Art

In a broadband radio access system, a direct link is established between a base station and a mobile station such that it is possible to establish the radio communication link between the mobile and base station in high reliability. However, the fixed location of the base station decreases the flexibility of the radio network configuration and, as a consequence, makes difficult to provide services efficiently in the radio environment in which the traffic distribution and call request amount are varying abruptly. In order to overcome this problem, a relay system for delivering data over multiple hops with adjacent relay stations is proposed in the broadband radio access system. The multi-hop relay system is advantageous to reconfigure the network quickly according to the ambient environment of the system such that it is possible to manage the entire radio network more efficiently. Accordingly, the self-adaptive radio communication network required in the next generation mobile communication system can be actually implemented with the multi-hop relay broadband radio access communication system model.

In the multi-hop relay broadband radio access communication system, the moving network means of network architecture simplifying the handover process as well as providing high quality service to each mobile station with the installment of relays along the paths on which a plurality of mobile stations are moving such as bus and train. In the moving network environment, since the relay provides the mobile stations with the service directly, the relay operates in non-transparent mode to transfer the preamble and MAP. Since the relay transmits the preamble directly, the movement of the relay close to the base station or a fixed or mobile relay using the same preamble causes collision of preambles.

DETAILED DESCRIPTION OF THE PRESENT INVENTION

In order to solve the above problems, the preamble change method and system for a moving network system of the present invention includes selecting a relay station of which preamble is to be changed; transmitting a signal of first preamble and a signal of second preamble alternately to at least one mobile station under control of the relay station; determining, at the selected relay station, whether the preamble is changed to the at least one mobile station; and transmitting, when the preamble is changed, only the signal of second preamble from the relay station to the at least one mobile station.

Preferably, determining includes receiving, at the selected relay station, a handover change complete signal from one of the at least one mobile station; counting the mobile station transmitted the handover change complete signal in the mobile terminals to which the preamble change has completed; and judging completion of preamble change to all of the at least mobile station when a number of the mobile stations counted is equal to a number of the mobile stations under control of the selected relay station.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

The following terms are defined in consideration of functions in the present invention, and the meanings thereof may vary according to the intention of a user or an operator or according to usual practice. Therefore, the definitions of the terms must be interpreted based on the entire content of the present specification.

Figure 1:
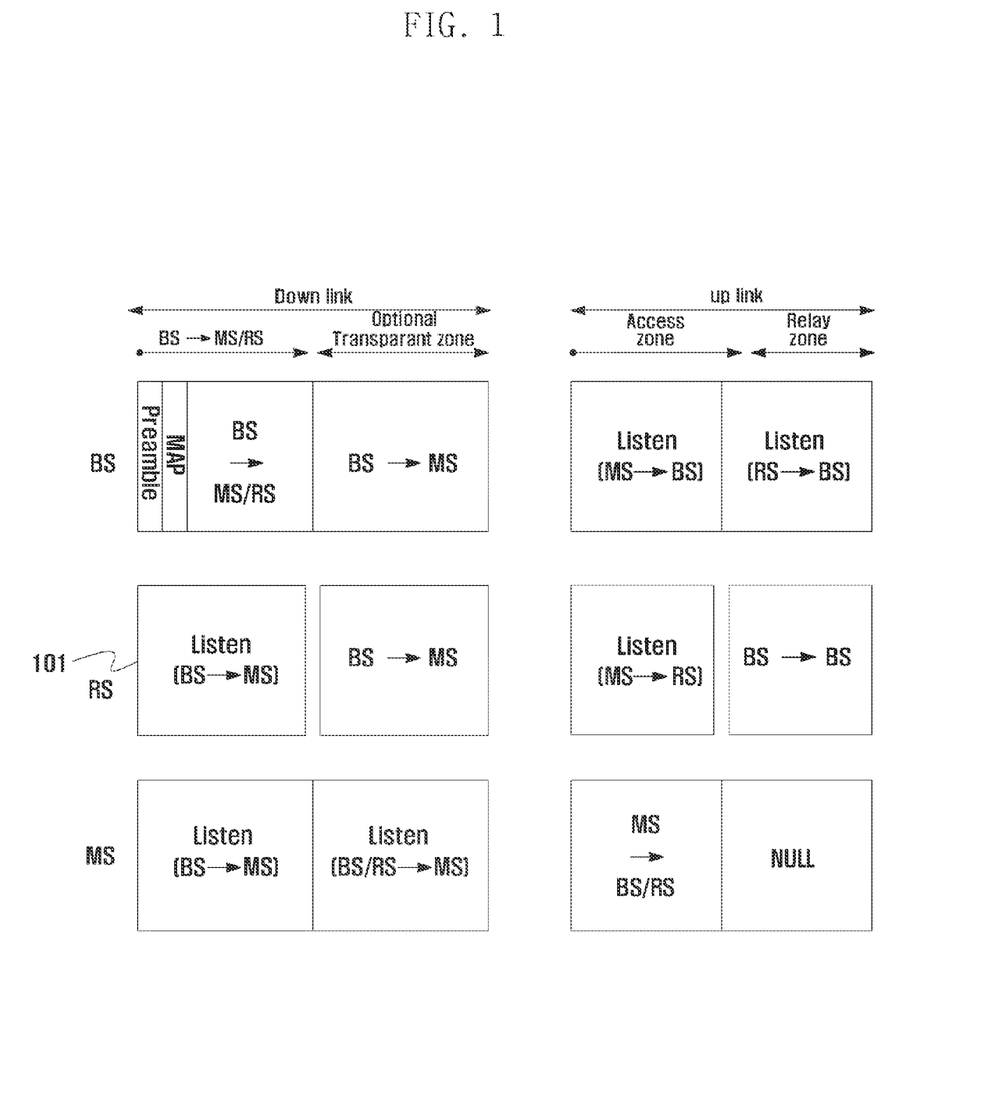
FIGS. 1 and 2 are diagram illustrating schematic format of data transmitted in a multi-hop relay system.
Figure 2:
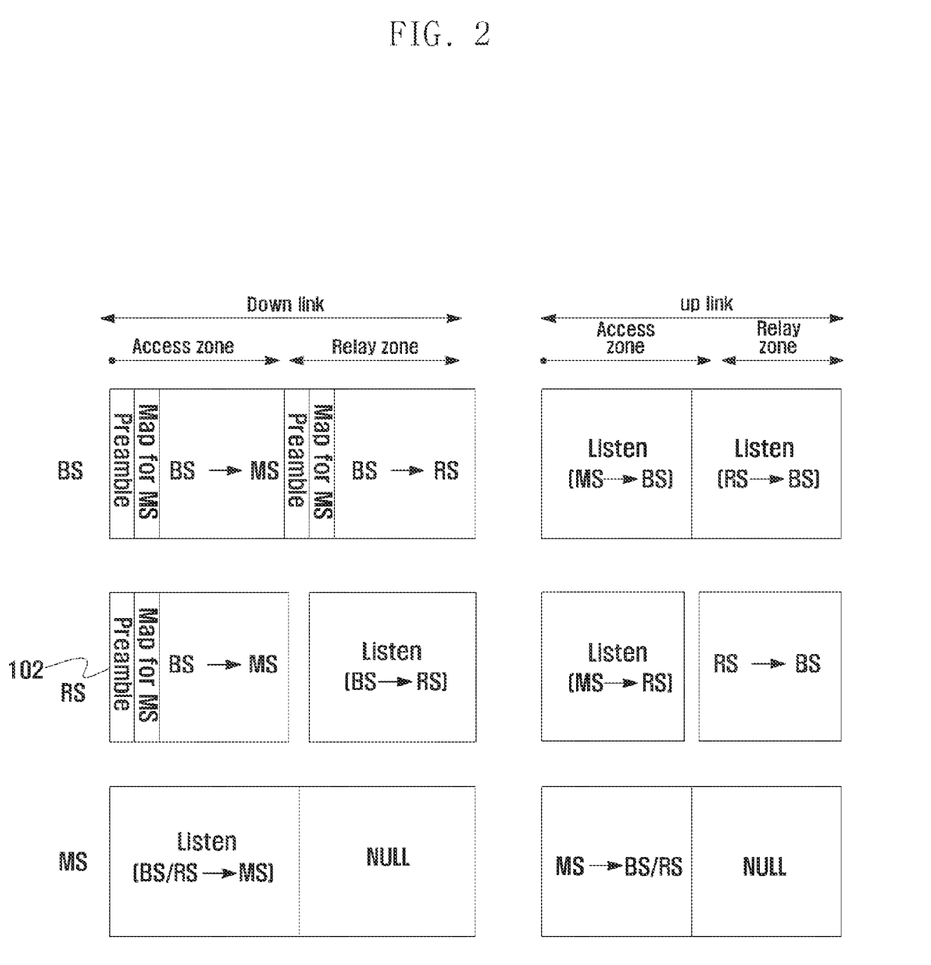

FIGS. 1 and 2 are diagram illustrating schematic format of data transmitted in a multi-hop relay system.

Referring to FIGS. 1 and 2, the relay according to an embodiment of the present invention operates in one of transparent mode and non-transparent mode.

In IEEE 802.16j, the relay can operate in the transparent mode in which all the Mobile Stations (MSs) within the cell coverage can receive the control information (e.g., preamble and MAP information) transmitted by the Base Station (BS) or in the non-transparent mode. In transparent mode, the MSs receives the control information from the BS directly and data via Relay Stations (RS). Meanwhile, in the non-transparent mode, the MSs receive both the control information and data via the RSs. Typically, the transparent mode is used to increase throughput within the cell, and the non-transparent mode is used to expand the cell coverage. Here, the preamble is the signal for acquiring synchronization between the BS and MS. Although the description is directed to the case using the preamble, the present invention is not limited thereto. That is, the present invention can be implemented with a synchronization channel rather than preamble in Long Term Evolution (LTE) and LTE-Advanced (LTE-A) systems.

The frame format transmitted in the transparent mode is depicted in FIG. 1. One frame is divided into downlink and uplink, and the downlink is divided into a direct zone direction communication between BS and MS or RS and an optional transparent zone for relaying data to MS via RS. The uplink is divided into an access zone for the MS to communicate with the RS or BS and a relay zone for the RS to communicate with the BS. Each MS receives the preamble and MAP information for MS from the BS directly to acquire synchronization, and the RS does not transmit preamble to the MS (as denoted by reference number 101).

The frame format transmitted in the non-transparent mode is depicted in FIG. 2. One frame is divided into downlink and uplink, and each link is divided into an access zone for the MS to communicate with the BS or RS and a relay zone for providing a link between the BS and RS. Here, the BS and RS transmits the preamble and MAP information at the same time point (102) such that the MS can acquire synchronization with the BS or RS and frame format configuration information.

Figure 3:
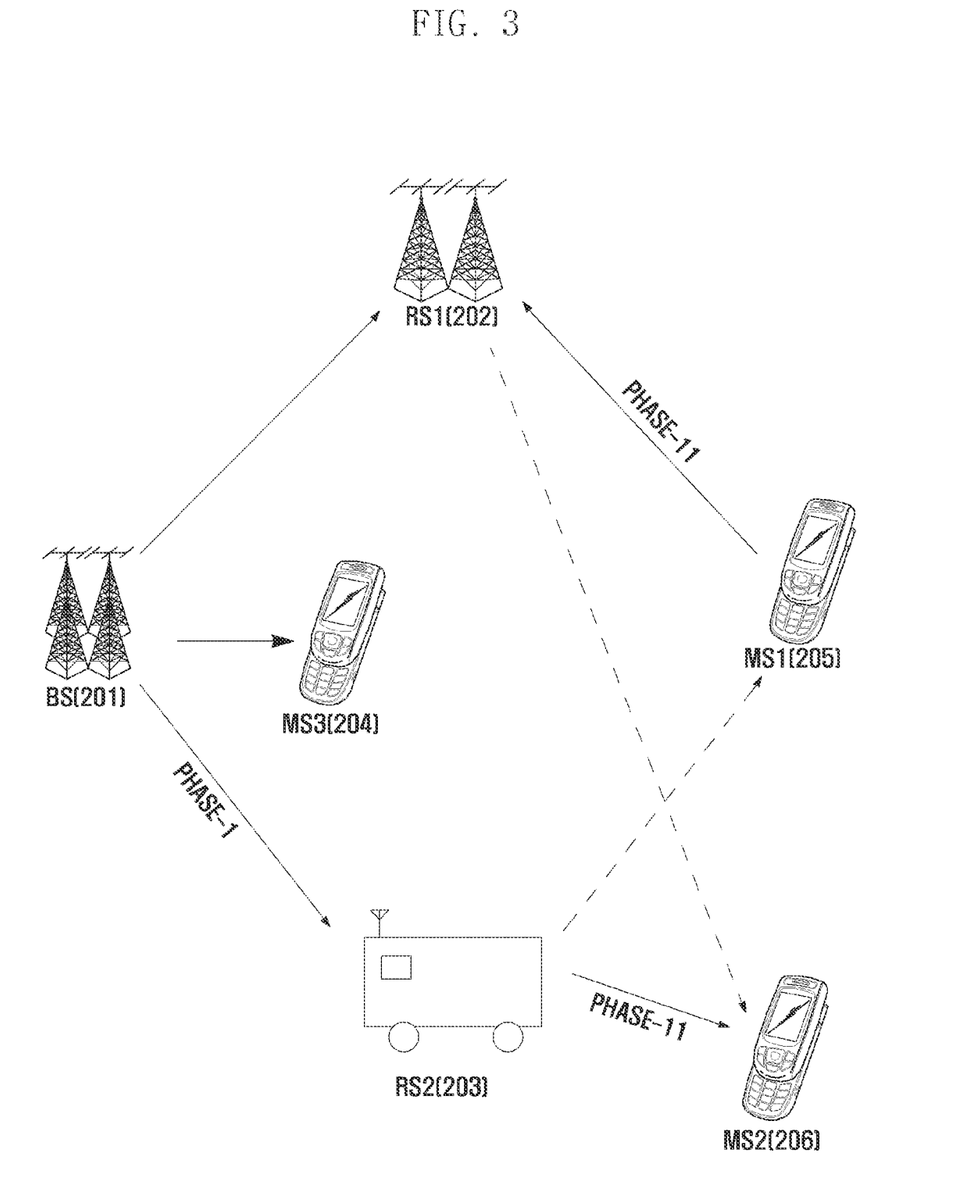
FIG. 3 is a diagram illustrating architecture of a typical multi-ho relay system.

FIG. 3 is a diagram illustrating architecture of a typical multi-ho relay system.

Referring to FIG. 3, the MS3 204 located in the coverage of the BS 201 connects to the BS 201 via a direct link. The MS1 205 and MS2 207 experiencing bad channel condition with the BS 201 out of the coverage of the BS 201 connect to the BS 201 via RS1 202 and RS2 203, i.e. relay links. When the MS1 205 and MS2 207 are in communication with the BS 201 in the area out of the coverage of the BS 201 or in a shadow area where the signal is blocked by buildings, the RS1 202 and RS2 203 are used for communication to the BS 101 in order to provide better radio channels.

In this manner, the BS 201 can provide high speed data channel using multi-hop relay technique in the cell boundary area having bad channel condition and expand the cell service area. The broadband radio access communication system based on the multi-hop relay technique uses the frame having two transmit periods (PHASE) on time axis for communication with the RS1 202 and RS2 203. That is, the BS-RS or BS-MS communication, i.e. direct link communication, is performed in the transmission period-1, and the RS-MS communication, i.e. relay communication for relaying the information transmitted from the BS to the RS during the transmission period-1, is performed in the transmission period-II.

Figure 4:
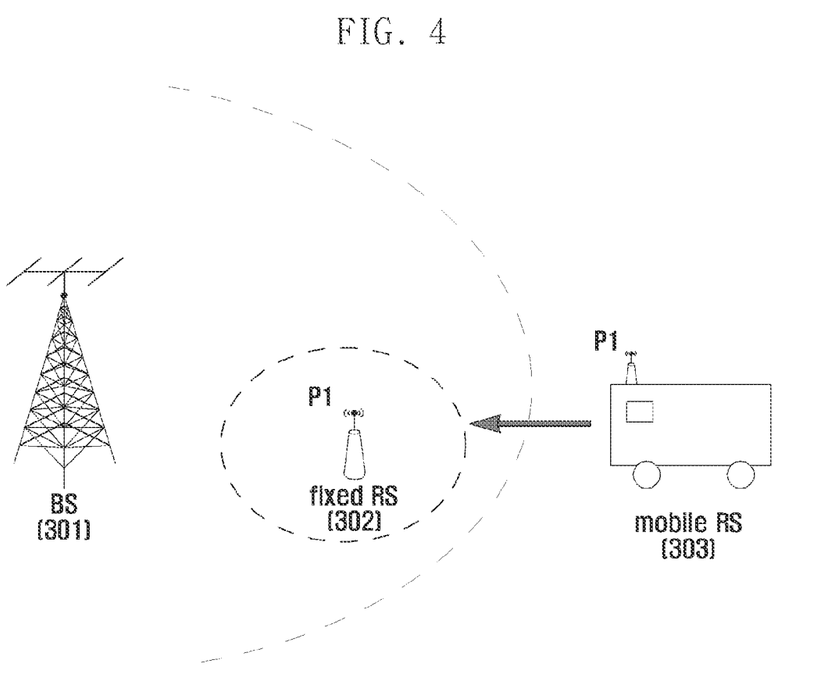
FIGS. 4 and 5 are schematic diagrams illustrating a situation in which preamble collision occurs as a mobile RS moves out of the moving network system according to an embodiment of the present invention.
Figure 5:
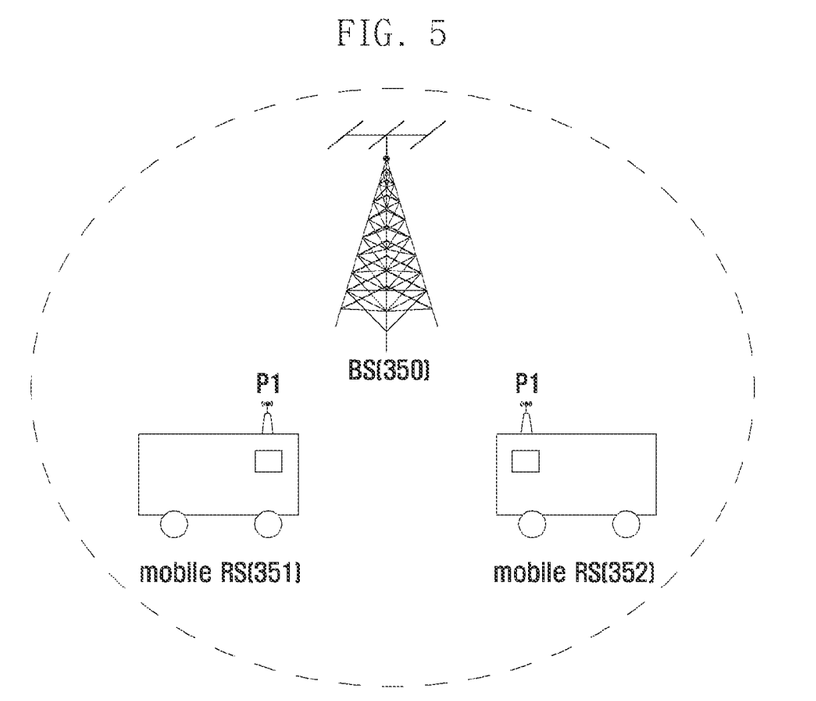

FIGS. 4 and 5 are schematic diagrams illustrating a situation in which preamble collision occurs as a mobile RS moves out of the moving network system according to an embodiment of the present invention.

Referring to FIG. 4, the multi-hop relay system includes a BS 301, a fixed RS 302, and a mobile RS 303. The BS 301 provides MSs with service directly or via the fixed and mobile RSs 302 and 303. FIG. 4 is depicted under the assumption that the fixed and mobile RSs 302 and 303 use the same preamble P1 and thus, as the mobile RS 303 approach the fixed RS 302, the service areas of the fixed and mobile RSs 302 and 303 are overlapped, resulting in preamble collision.

FIG. 5 is depicted under the assumption that the BS 350 provides the MSs with service via the first and second mobile RSs 351 and 352 with the same preamble P2. In this case, as the first and second mobile RSs 351 and 352 approach each other, the preamble collision occurs to cause significant interference.

In order to overcome the problems occurred in the situations of FIGS. 4 and 5, it has been proposed to assign a relay preamble separately. In this case, it is possible to avoid preamble collision with other BS or fixed RS. However, since the total number of preamble available for the communication system is limited, the efficient cell planning and maximization of the system throughput can be achieved with preambles as many as possible. In case that the mobile RSs are assigned fixed preambles, efficient cell planning is impossible since available preamble range is limited. Furthermore, although the fixed preambles are assigned for the mobile RSs, it cannot be the solution for solving the preamble collision among the mobile RSs, and this problem is likely to become more significant in the next generation mobile communication environment due to the increase of the moving network in size.

Another method proposed to solve the problems occurring in the situations of FIGS. 4 and 5 is a virtual RS grouping. In this method, when preamble collision occurs among the mobile RSs, the mobile RSs are bound into a group to operate as a single delay and thus avoid interference. That is, through cooperation among the RSs, the individual relays transmit the same signal to the MSs at the same time. This gives an effect as if the MS communicate with one relay, resulting in avoidance of communication failure caused by interference. Also, the current draft of IEEE 802.16j specifies a technique related to the grouping of relays. In the virtual RS grouping, however, since two or more RSs or BSs transmit the same signal to operate as a virtual cell, the entire system throughput decreases significantly. In case of the virtual grouping of RSs, it is necessary to exchange information among the RSs and this increases traffic overhead. Also, since the grouping and de-grouping are repeated as the RSs move, it is not efficient to apply the virtual group to the environment where a plurality of mobile RSs exists.

Another approach to solve the above problem is to change the preamble of one of the REs using the same preamble when preamble collision occurs. Actually, the IEEE 802.16j standardization group has defined a message and field for changing the preamble.

In case that an RS changes preamble, the MS associated with the MS acquires synchronization using the changed preamble and receives signal. In view of the MS, since the change of preamble is equal to change of relay connected, the MS can cope with the preamble change through handover process. In IEEE 802.16 standard, it is specified for all the MSs perform handover process when the RS changes the preamble. Here, if the RS uses a preamble P1, this means that the frame transmitted by the RS has the preamble P1. If the MS uses preamble P1, this means that the MS is prepared to receive the frame having the preamble P1. In general, the preamble is associated with the identification of BS and the physical structure of the frame, the MS should know the preambles of the BS and RS attached thereto to receive the frame correctly. However, this method also has a shortcoming. Since it is impossible for all of the MSs to perform handover at the same time, temporary communication disconnects are likely to occur.

The reason why the handover complete timings of the MSs differ from each other is because the handover message delivery timings differ due to some factors such as scheduling. Before the handover is performed successfully, the MS operates in synchronization with the old preamble and, once the hand over succeeds, operates in synchronization with the new preamble. When the handover timing is identical with the preamble change timing, the MS can operate without frame loss.

For example, in a situation where the RS does not change the preamble even after the successful handover of the MS, if the MS tries to receive a new preamble while the RS is transmitting the old preamble, it is impossible for the MS to maintain the communication. Otherwise, if the RS has changed the preamble in advance before the MS completes the handover, the UE tries to receive the signal with the old preamble and thus cannot exchange handover messages any more.

Figure 6:
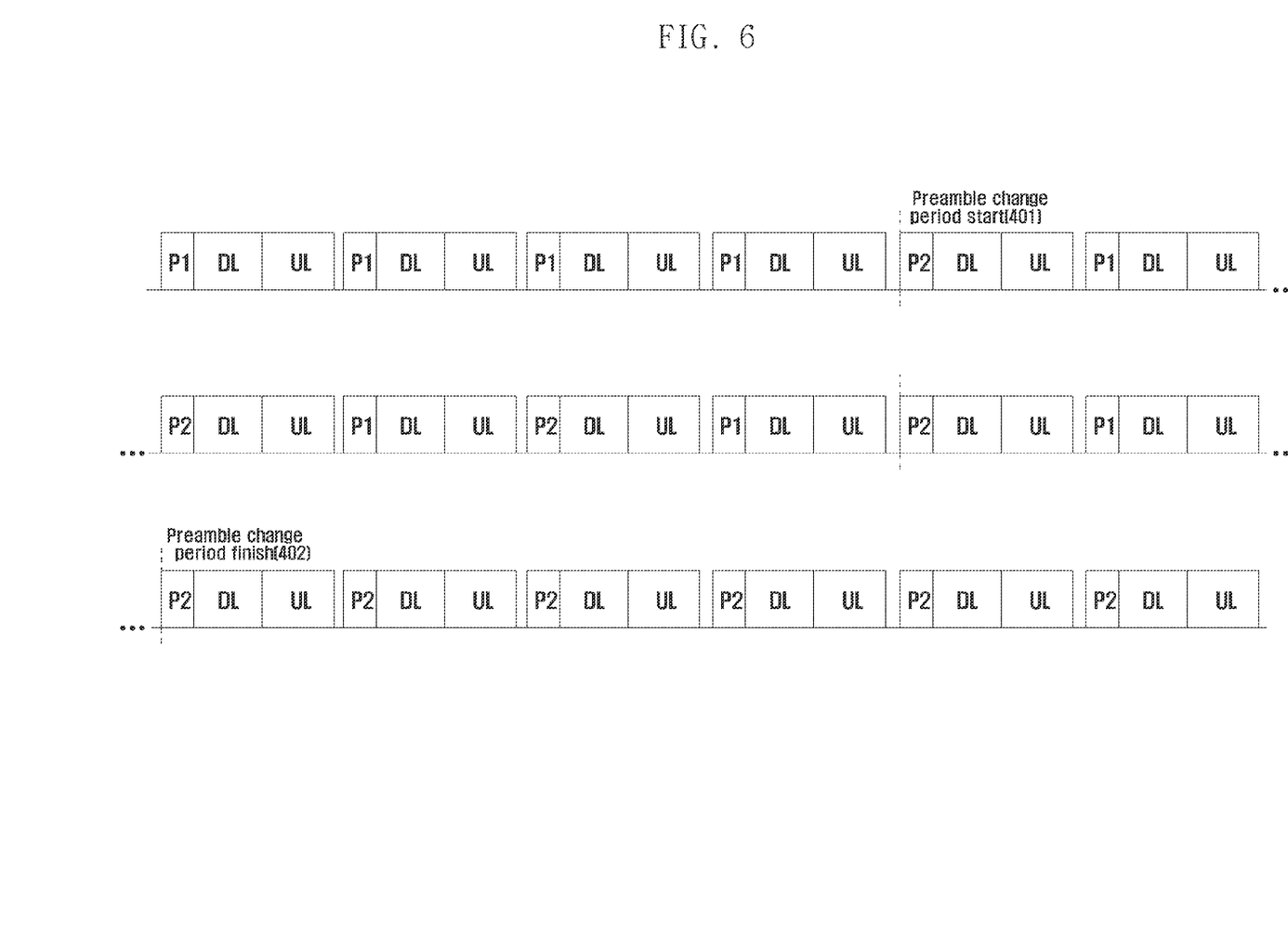
FIG. 6 is a diagram illustrating signals transmitted by the RSs during the preamble change period to avoid preamble collision according to an embodiment of the present invention.

FIG. 6 is a diagram illustrating signals transmitted by the RSs during the preamble change period to avoid preamble collision according to an embodiment of the present invention.

Referring to FIG. 4 under the assumption that the preamble before change is the first preamble P1, the preamble after change is the second preamble P2, downlink is DL, and uplink is UL, the RS transmitting P1 is aware of the necessity of the preamble change and notifies all the MSs attached thereto of the start of preamble change. The process for notifying of the preamble change in the communication system is triggered by a handover command. The preamble change start notification time is referred to as start of preamble change period 401.

After notifying of the preamble change start, the RS transmits P1 and P2 alternately in frames. That is, one frame carries P1 and the next frame carries P2. In this case, the MS which has completed handover successfully can operate normally with the frame having P2 and the MS which has not completed the handover operates with the frame having P1.

Each MS which has received the handover command tries to operate with the new preamble through predetermined handover message exchange. Through the handover message exchange, the MS acquire the information on the new preamble. After successful handover, the MS can operate with the new preamble. The MS which has completed the handover can communicate normally in the frame carrying P2 which is transmitted by the RS. In contrast, the MS which is in the process of handover yet can communicate in the frame carrying P1 which is transmitted by the RS. It is assumed that the RS knows the number of MSs attached thereto, and the number of MS is N. The RS checks that all of N MSs have completed handover successfully, releases the preamble change period 402, and transmits P2 in every frame from then. This means that the preamble has been changed successfully.

A description is made of signal flows between BS, RS, and MS for changing preamble hereinafter. In order to simplify the explanation, the description is directed to the case where the RSs are mobile RSs.

Figure 7:
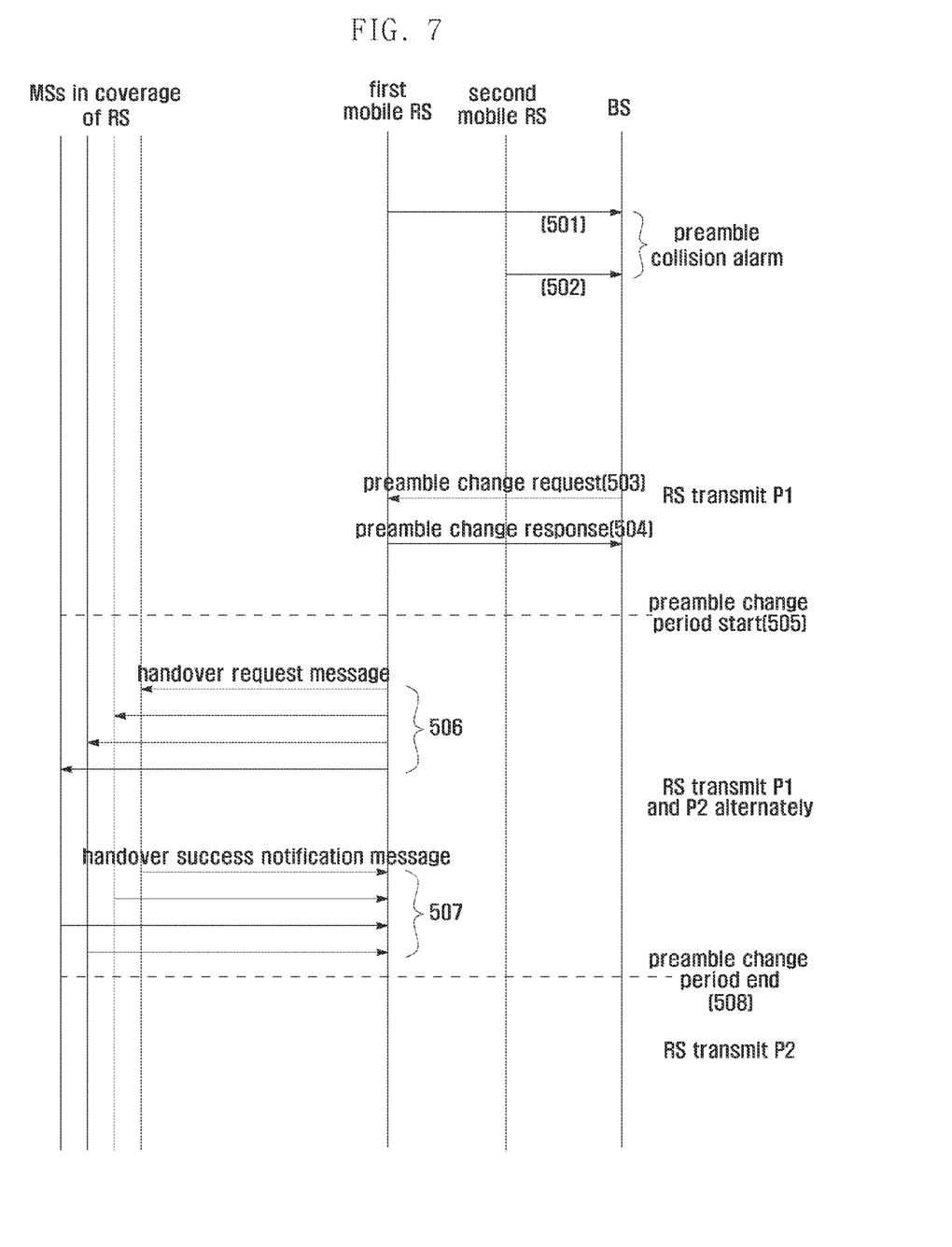
FIG. 7 is a signaling diagram illustrating signal flows among BS, RS, and MS according to an embodiment of the present invention.

FIG. 7 is a signaling diagram illustrating signal flows among BS, RS, and MS according to an embodiment of the present invention.

Referring to FIG. 7, the first and second mobile RSs detect the preamble collision and transmit collision alarm signals to the BS (501 and 502). Upon receipt of the collision alarm signals, the BS selects one of the first and second mobile RSs for changing the preamble of the selected RS. The RS selection can be performed in various manners. For example, the BS can compare the total numbers of MSs connected to the respective RSs with each other and select the RS to which a less number of MSs are connected than the other for changing the preamble thereof. The BS also can checks numbers of MSs in active state and in idle state that a connected to the respective RSs and selects the RS having more MSs in activate state for changing the preamble thereof. In this embodiment, the description is made under the assumption that the first mobile RS is selected.

Next, the BS transmits a preamble change request signal to the first mobile RS (503). Upon receipt of the preamble change request signal, the first mobile RS transmits a preamble change response signal to the BS (504) and starts a preamble change period (505). Next, the first mobile RS notifies all the MSs within its coverage of the start of preamble change and transmits the first preamble P1 before the change and the second preamble P2 after the change alternately in frames during the preamble change period.

Next, the first mobile RS transmits a handover request message to all the MSs connected to the first mobile RS (506). Here, the handover request message is transmitted in the frame having the preamble P1, and each UE received the handover request message acquires signal synchronization with the first preamble P1 and then the second preamble P2. Next, the MS transmits a handover indication message to the first mobile RS (507). Once the handover indication message is received from all the MSs connected thereto, the first mobile RS ends the preamble change period (508). As a consequence, the first mobile MS transmits the frame the second preamble P2.

Figure 8:
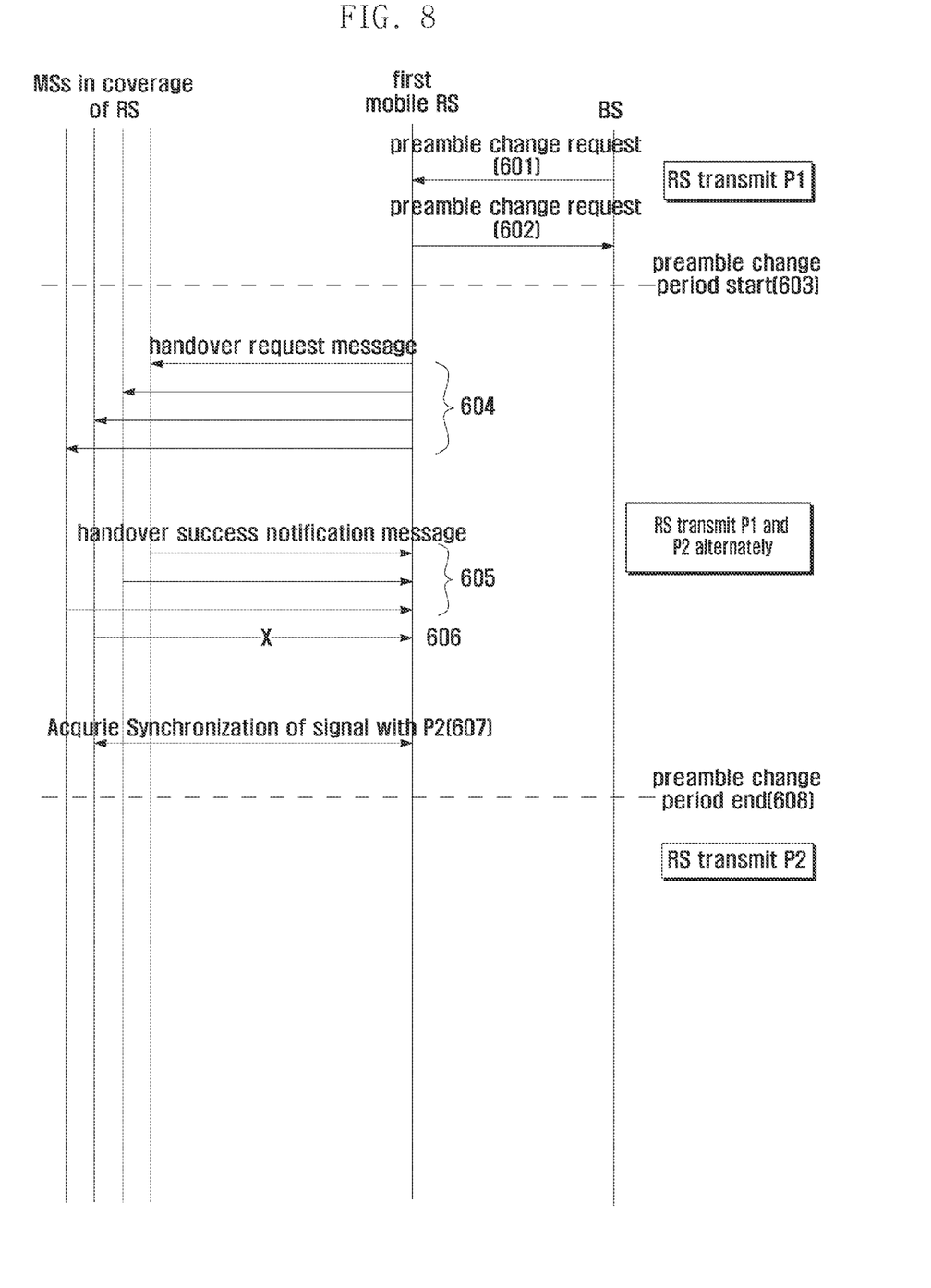
FIG. 8 is a signaling diagram illustrating flows among BS, RS, and MS according to anther embodiment of the present invention.

FIG. 8 is a signaling diagram illustrating flows among BS, RS, and MS according to anther embodiment of the present invention. Particularly, FIG. 8 shows the procedure when the handover indication message lost in the delivery to the RS. In this embodiment, the detailed description on how the BS selects the RS to change the preamble thereof is omitted.

Referring to FIG. 8, the BS transmits a preamble change request signal to the mobile RS (601). Upon receipt of the preamble change request signal, the mobile RS transmits a preamble change response signal to the BS (602) and starts a preamble change period (603). The mobile RS notifies all the MSs within its coverage of the start of preamble change period and transmits the first preamble P1 before change and the second preamble P2 after change in frames alternately during the preamble change period.

The mobile RS transmits a handover request message to the MS (604). Here, the handover request message carried in the frame having the first preamble P1, and the MS receive the handover request message acquires synchronization of the received signal with the first preamble P1 and then the second preamble P2. Next, each MS transmits a handover indication message to the RS (605).

At step 606, it is assumed that the handover indication message transmitted by the MS is lost. In this case, the MS is likely to recognize that it has completed the handover while the RS recognizes that the handover has not completed yet, in the conventional method. Accordingly, the MS attempts to receive the frame having the second preamble P2 while the RS continues transmitting the frame having the first preamble P1, resulting in communication failure. In the present invention, however, the RS transmits the first preamble P1 and the second preamble P2 alternately such that the MS can transmit the handover indication message and then receive the frame having the second preamble P2. The mobile RS can check the MS which has completed the handover with the information indicating that the MS starts receiving the frame having the second preamble P2.

Once it is determined that that all of the MSs have completed handover, the RS ends the preamble change period (608) and then starts transmitting the frame having the second preamble P2.

Figure 9:
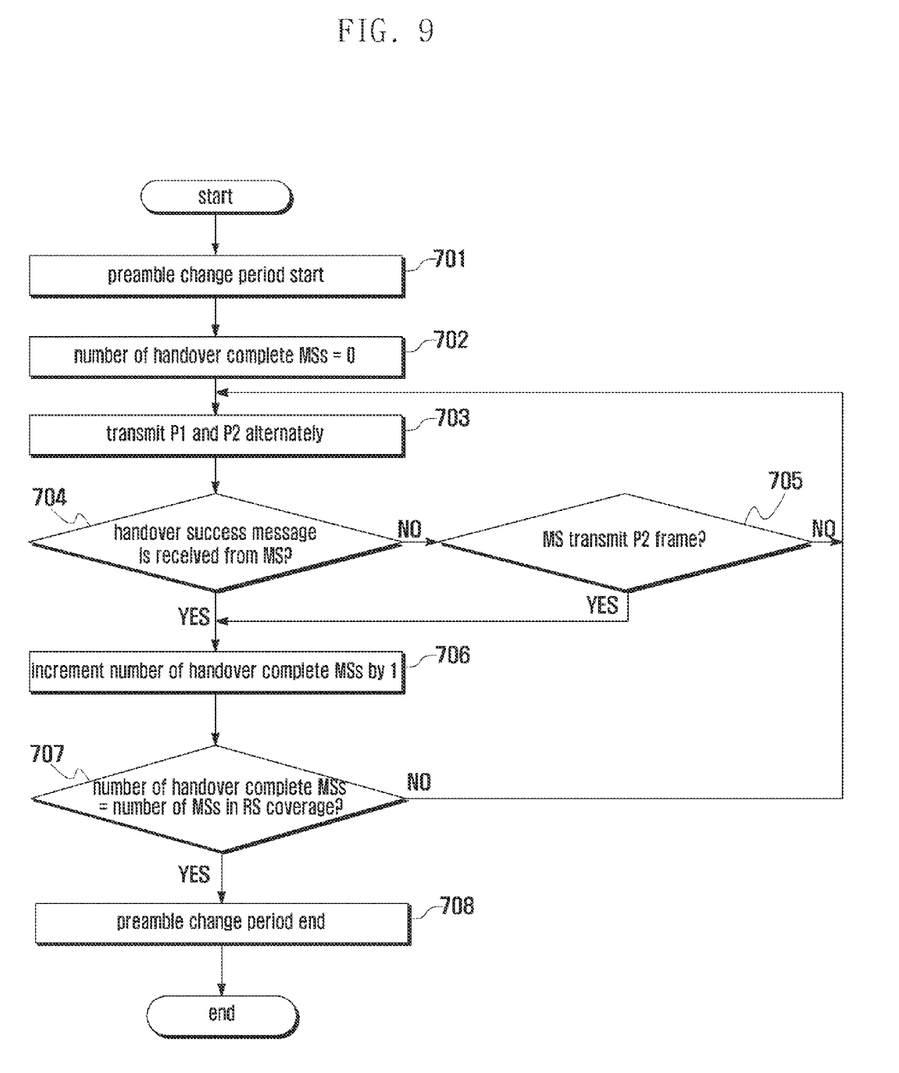
FIG. 9 is a flowchart illustrating a procedure of the RS during the preamble change period according to an embodiment of the present invention.

FIG. 9 is a flowchart illustrating a procedure of the RS during the preamble change period according to an embodiment of the present invention.

Referring to FIG. 9, the RS notifies the MSs in its coverage of the start of preamble change and starts the preamble change period (701). Next, the RS initializes a counter indicating a number of MSs which have completed handover to 0 (702).

Next, the RS transmits the first preamble P1 before change and the second preamble P2 after change alternately (703).

The RS transmits a handover request message to the MS using the frame having the first preamble P1, and the MS received the handover request completes the handover from the first preamble P1 to the second preamble P2 and transmits a handover indication message.

Next, the RS determines whether the handover indication message is received from the MS (704). If the handover indication message is received successfully at step 704, the RS increments the counter by 1 (first counting step) (706) and, otherwise if the handover indication is not received, determines whether the MS receives the frame having the second preamble P2 with the acquisition based on the second preamble P2 (705). That is, the RS transmits the frame having P1 and the frame having P2 alternately during the preamble change period according to the present invention such that the MS can complete the handover successfully and receive the frame having P2 even though the RS does not receive the handover indication message. Accordingly, it is determined that the MS receives the frame having the second preamble P2, the RS increments N by 1 (second counting step) at step 706.

The RS compares a number of MSs under its control with the counter N (707) and, if the number of MSs is equal to N, the RS ends the preamble change period (708).

Figure 10:
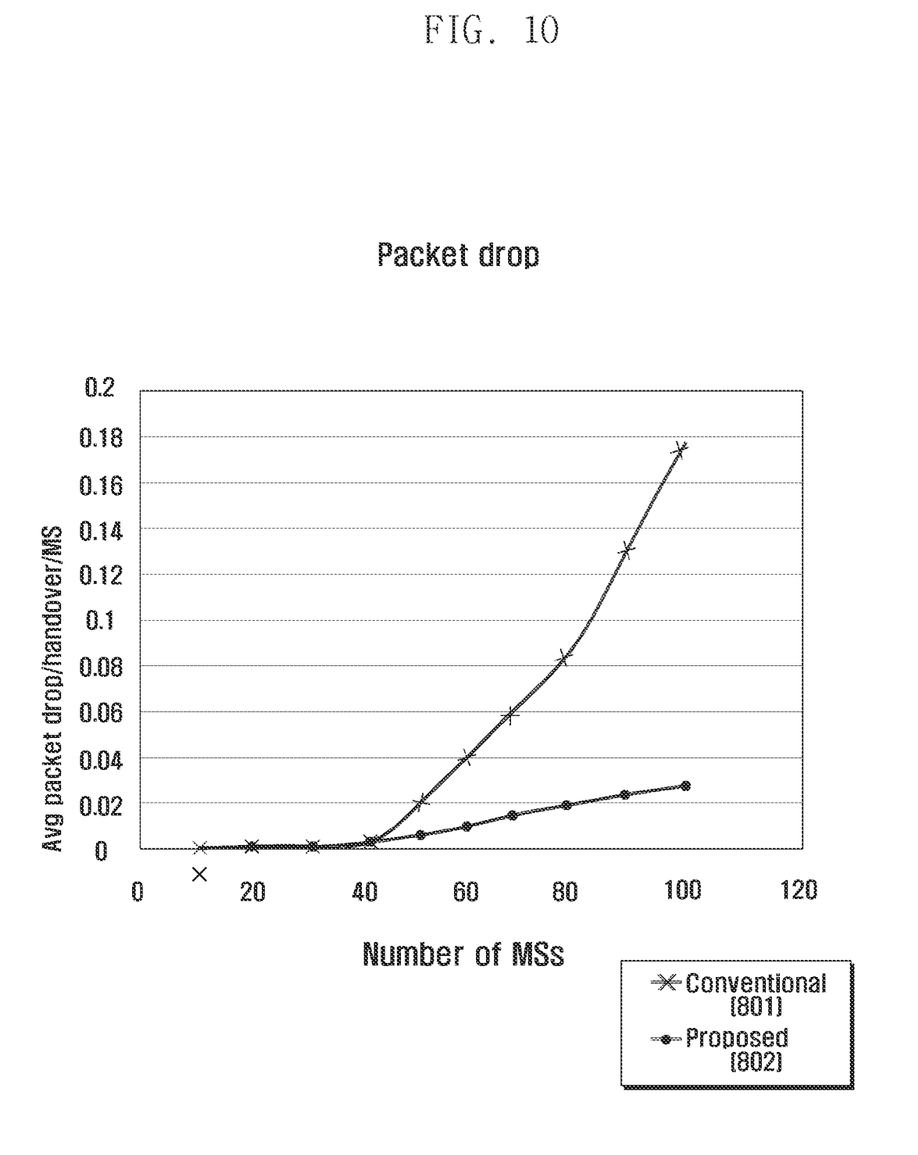
FIG. 10 is a graph illustrating data loss rates with the preamble change method according to an embodiment of the present invention and the conventional method.

FIG. 10 is a graph illustrating data loss rates with the preamble change method according to an embodiment of the present invention and the conventional method.

In FIG. 10, the data loss rate of the conventional preamble change method 801 and the proposed preamble change method 802 are compared in the form of a graph.

Here, the data loss is measured under the assumption that the error rate of the transmitted data is 0.02, the data occur at an interval of 20 ms, and the data are delayed 50 ms in queue. It is assumed that the transmission data and handover message are transmitted using the resources having the same size, one frame has a length of 5 ms, and up to 10 messages can be transmitted at a time. In this environment, the data loss rate of the proposed method 802 in which the preambles are transmitted alternately is very low as compared to that of the conventional method 801. This is because the communication disconnects caused by MS waiting for the change of preamble of the RS is solved in the present invention.

The preamble change method and system for the moving network system according to the present invention minimizes the communication disconnect time of the MS in a situation where the mobile RS has to change its preamble to provide all the MSs with the information efficiently without loss, resulting in improvement of utilization of the moving network.

Industrial Applicability

The embodiments disclosed in the specification and drawings aim only to help understand but not limit the present invention. Meanwhile, persons ordinarily skilled in the art would make modifications in terms of specific embodiments and application scopes without departing from the concepts of the present invention.

What is claimed is:

1. A method for changing preamble in a relay station, the method comprising:
   transmitting, when a preamble collision is detected, a signal of first preamble and a signal of second preamble alternately to at least one mobile station under control of the relay station;
   determining whether the preamble is changed to the at least one mobile station; and
   transmitting, when the preamble is changed for all mobile stations under control of the relay station, only the signal of second preamble from the relay station to the at least one mobile station.

2. The method of claim 1, further comprising:
   transmitting a preamble collision alarm signal to a base station; and
   receiving a preamble change request signal from the base station for the transmitting the signal of first preamble and the signal of second preamble alternately.

3. The method of claim 1, wherein determining comprises:
   receiving a handover change complete signal from one of the at least one mobile station;
   counting the mobile station transmitted the handover change complete signal in the mobile terminals to which the preamble change has completed; and
   judging completion of preamble change to all of the at least mobile station when a number of the mobile stations counted is equal to a number of the mobile stations under control of the relay station.

4. The method of claim 3, wherein counting comprises:
   determining whether one of the at least one mobile station has acquired synchronization using the second preamble; and
   counting the mobile station which has acquired synchronization using the second preamble in the mobile terminals to which the preamble change has completed.

5. A moving network system, the system comprising:
   a base station which selects one of at least two relay stations using a first preamble for changing the preamble of the selected relay station;
   a relay station which detects a collision between preambles of at least two relay stations, when the preamble is changed, transmits a signal of first preamble and a signal of second preamble alternately to at least one mobile station under control of the relay station; and
   at least one mobile terminal which transmits, when the preamble change has completed, a handover change complete signal to the relay station.

6. The moving network system of claim 5, wherein the relay station transmits a preamble collision alarm signal to the base station.

7. The moving network system of claim 5, wherein the relay station counts, when a handover change complete signal is received from one of the at least one mobile station, the mobile station transmitted the handover change complete signal in the mobile terminals to which the preamble change has completed and judges, when a number of the mobile stations counted is equal to a number of the mobile stations under control of the selected relay station, completion of preamble change to all of the at least mobile station.

8. The moving network system of claim 7, wherein the relay station counts the mobile station which has acquired synchronization using the second preamble in the mobile terminals to which the preamble change has completed.

9. An apparatus of a relay station for changing a preamble in mobile network, the apparatus comprising:
   a transceiver configured to perform data communication; and
   a controller configured to transmit, when a preamble collision is detected, a signal of a first preamble and a signal of a second preamble alternately to at least one mobile station under control of a relay station, to determine whether the preamble is changed to the at least one mobile station, and to transmit, when the preamble is changed for all mobile stations under control of the relay station, only the signal of second preamble from the relay station to the at least one mobile station.

10. The apparatus of claim 9, wherein the controller is further configured to transmit a preamble collision alarm signal to a base station and to receive a preamble change request signal from the base station for the transmitting the signal of the first preamble and the signal of the second preamble alternately.

11. The apparatus of claim 9, wherein the controller is further configured to receive a handover change complete signal from one of the at least one mobile stations and to count the mobile stations to which were transmitted the handover change complete signal in connection with which the preamble change has completed, and to judge a completion of the preamble changes to all of the at least one mobile station when a number of the mobile stations counted is equal to a number of the mobile stations under control of the relay station.

12. The apparatus of claim 11, wherein the controller is further configured to determine whether one of the at least one mobile station has acquired synchronization using the second preamble, and to count the mobile station which has acquired synchronization using the second preamble in the mobile terminals to which the preamble change has completed.

13. A method for changing a preamble in a base station, the method comprising:
receiving preamble collision alarm signals from at least two relay stations;
selecting, when a preamble collision is detected based on the received alarm signal, a relay station of which preamble is changed; and
transmitting a preamble change request signal to the selected relay station,
wherein the preamble change request signal is used for changing preamble in the selected relay station.

14. The method of claim 13, wherein the selected relay station transmits a signal of a first preamble and a signal of a second preamble alternately to at least one mobile station under control of the relay station, and determines whether the preamble is changed to the at least one mobile station and transmits, when the preamble is changed for all mobile stations under control of the relay station, only the signal of second preamble from the relay station to the at least one mobile station.

15. An apparatus of a base station for changing preamble, the apparatus comprising:
a transceiver configured to perform data communication; and
a controller configured to receive preamble collision alarm signals from at least two relay stations, to select, when a preamble collision is detected based on the received alarm signal, a relay station of which preamble is changed and to transmit a preamble change request signal to the selected relay station,
wherein the preamble change request signal is used for changing preamble in the selected relay station.

16. The method of claim 15, wherein the selected relay station transmits a signal of first preamble and a signal of second preamble alternately to at least one mobile station under control of the relay station and determines whether the preamble is changed to the at least one mobile station, and transmits, when the preamble is changed for all mobile stations under control of the relay station, only the signal of second preamble from the relay station to the at least one mobile station.

* * * * *